May 12, 1925.
F. J. DOWLING
UNION PIPE FITTING
Filed Nov. 12, 1924
1,537,755
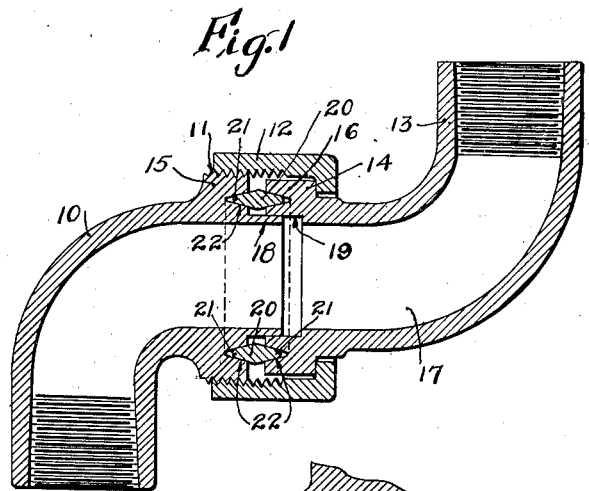
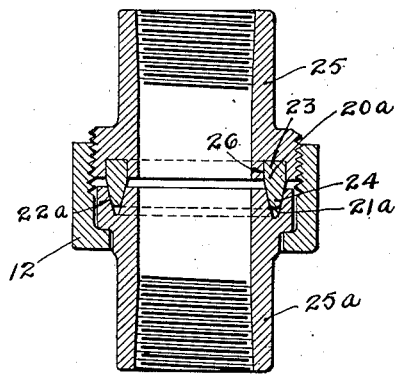
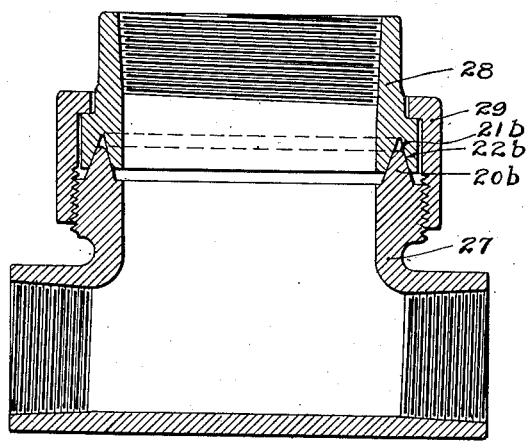
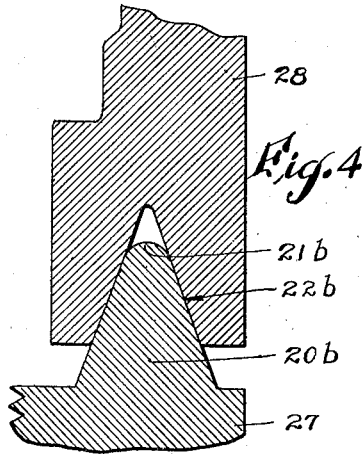
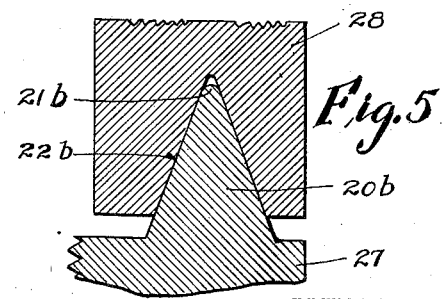
INVENTOR
F. J. Dowling
BY
ATTORNEY Patented May 12, 1925.

1,537,755

UNITED STATES PATENT OFFICE.

FRANCIS J. DOWLING, OF NEW YORK, N. Y.

UNION PIPE FITTING.

Application filed November 12, 1924. Serial No. 749,365.

*To all whom it may concern:*

Be it known that I, FRANCIS J. DOWLING, a citizen of the United States, residing at New York city, borough of Manhattan, in the county of New York and State of New York, have invented certain new and useful Improvements in Union Pipe Fittings, of which the following is a specification.

This invention relates to pipe fittings and more particularly to sealing means used in connection with fittings and the like for securing a tight joint in a pipe line irrespective of the pressure upon the fluid therein, or in solder nipples.

Among the objects of this invention is to provide a special ring and seat construction for use in a fitting or other device commonly used for uniting together sections of a pipe line to permit said pipe line to be rapidly assembled and to insure absolute fluid tightness of the same.

Another object of this invention is to provide a union fitting having a special ring and seat construction adapted to be applied to straight or angular fittings, flanges, or the like and whether reducing or otherwise and so arranged as to provide a continuously new seat for the ring thus eliminating the deleterious effects of wear and corrosion and increasing the life of the fitting so as to permit the same to be disconnected as often as may be desired without affecting the leakproof qualities thereof.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof, reference is had to the accompanying drawings in which like reference characters designate the same parts in the several views, and in which—

Figure 1 is a sectional view of an offset fitting showing the ring and seat construction.

Fig. 2 is a sectional view of a straight coupling showing a form of my improvement.

Fig. 3 is a sectional view of a reducing T showing another modification of my invention.

Fig. 4 shows an enlarged sectional detail view of the ring and seat construction.

Fig. 5 is a view of the same after having been subjected to long and repeated use in the usual manner.

Referring now more specifically to the drawings 10 indicates a part or section of a union fitting which is threaded at 11 to engage the collar 12 and thus to retain the other part 13 of the fitting in connection therewith in the usual manner as by causing the collar to bear upon a peripheral shoulder 14 of the latter part. Both parts of the fitting are provided at their meeting or contacting portions with enlarged annular portions 15 and 16 located without the passageway 17 of the fitting and within the collar 12. Said enlarged portions of the fitting may be provided with a telescopic joint comprising an annular lip 18 which is slidable in contact with the other enlarged portion of the fitting as within a recess 19 thereof. This telescopic joint provides not only for considerable lateral stiffness in the fitting but also insures that any corroding substances that may be contained within the pipe will not come into direct contact with the special ring and seat construction which forms the essential principle of my invention.

In many of the union fittings employed in the market to-day which are provided with sealing means that are effective at high pressures, it is found that after corrosion or other wear that occurs in the fitting incident to its use in a pipe line, if it be desired to disconnect the union fitting for the purpose of dismounting a section of the pipe line as for purposes of repair, inspection, and the like, that the fitting must often be discarded because of the corrosion which has occurred at the seat of the union and the consequent impossibility to find a new seat which is necessary in such a case to secure the requisite degree of fluid tightness. My invention aims to remedy this condition by providing a fitting which is sufficiently cheap for ordinary commercial use and which will afford a new and fresh seat for the seating member used therein irrespective of the amount of corrosion which may have occurred in those portions of the fitting which are exposed directly or indirectly to the fluid within the pipe line. The new seat is provided automatically as a result of the pressure exerted upon the main parts of the fitting for forcing them together in making up tight. Thus the life of the fitting is increased and the expense incident to upkeep and repair as in power plants and the like is greatly reduced while the labor necessary to remove ineffective or leaking fittings from pipe lines is eliminated since my invention provides for renewed use of the same fitting for an indefinite period of time.

A ring or tongue 20 is provided which can be made of any suitable and preferably slightly ductile material, said ring having one or more faces inclined to the axis of the ring. More specifically the ring has portions which are thinner at the face planes of the ring due to the fact that the inner and outer sides of the ring have inclined surfaces whose elements form a parallelogram with each other. The corners at the ends of the long diagonal of the parallelogram are well rounded out as shown at 21, the form and size of the curves being exceedingly important as will soon be disclosed. The annular portions 14 and 15 are provided with grooves 22 whose sides are substantially parallel to the sides of the ring, so as to snugly contact therewith, but the grooves being deeper than the portion of the ring received thereby thus giving the groove a sharper apex than that of the ring portion received thereby, reference being had to the curves 21 of the ring. The faces of the groove are formed by conical surfaces where elements intersect substantially at the apex of the groove, thus providing a continuous conical surface contact to the very apex of the slot. After the fitting has been used for a certain length of time and corrosion has occurred upon the ring and the seat, a new seat may be produced by tightening up strongly upon the collar member 12 whereby the ring 20 is caused to flow slightly deeper into the grooves 22. This flow of the metal of the ring is greatly facilitated by the curved portions 21 thereof which reduce friction and prevent injury to the sides of the grooves. Moreover, because the sides of the grooves extend in straight lines and in parallel relation to the sides of the ring, a series of new seats may be formed as the ring is pressed into the grooves. The precise action and effect of the continuous conical surface contact may be noted by observing Figures 4 and 5. Because of the novel form of the seat, the ring is always of uniform character, and the possibility of injuring or distorting the ring is eliminated. Thus if the operator should cause the ring to flow into the groove until it should impinge upon the apex thereof, he would thereupon be compelled to stop, and without having in any way injured the fitting. The principle just disclosed may be embodied in numerous forms as will now be described.

In Fig. 2, a ring or tongue 20$^a$ is shown which has one flat or square portion 23 and one tapering or converging portion 24 which is curved as shown at 21$^a$. The flat portion 23 of the ring is secured to the part 25 of the union fitting in any suitable manner as by being seated within a recess 26 formed therein. The other part 25$^a$ of the fitting is provided with a groove 22$^a$ of the character previously described, the groove forming a double seat for the ring, the sides of the groove being substantially parallel to the sides of the tapering portion of the ring and being deeper than the portion of the ring to be received, thus providing for a renewable seat in the manner already described.

An important modification of the invention is shown in the reducing coupling or T shown in Fig. 3 wherein a ring or tongue 20$^b$ is formed as an integral portion of the part 27 of the fitting and projecting outwardly therefrom to seat in the groove 22$^b$ formed in the other part 28 of the fitting. The portions of the ring and groove which engage with each other are of the same character as those already described and act in the same way. Thus pressure exerted upon the ring 20$^b$ when the collar member 29 is tightened will cause the metal of the ring to flow in the region of the curved portion 21$^b$ into the groove and thus cause a new seating of the ring therewith.

My invention is applicable to all types of fittings whether threaded or flanged or both and comprises essentially the means for producing a new seat and thus to eliminate the effect of corrosive action in rendering a fitting ineffective for making up tight. Said means is shown herein as comprising a double seat feature due to the fact that contact occurs between the sides of the groove and the sides of the ring. The main parts of each fitting are spaced apart from each other to permit the requisite movement of the parts toward each other when the fitting is tightened and the ring caused to flow into the groove. The continuously straight sides of the groove which are parallel to the sides of the ring insure that the new seat produced will be of an even and uniform character, and this result is greatly facilitated because the ring or tongue is provided with a rounded apex tending in co-operation with the uniform character of the sides of the groove to form, as described, a reliable and absolutely leakproof construction. While all the pipe fittings shown are indicated with female threads, it will be understood that the invention contemplates the use of any members irrespective of the shape thereof or the character of the threads.

I claim:

1. A pipe connection comprising, in combination, a plurality of co-operating members having a tubular passage, and means for forcing said members into engagement with each other, one of said members having an annular groove spaced from and surrounding said passage and constituting a double-faced seat, the other member having a tongue mating with said groove, the faces of said groove being of conical formation and intersecting to form a substantially acute angle so as to form a groove of conical section, said tongue being of approximately conical cross-section and having elements in contact with the elements of the groove thus providing for a conical surface contact along each of the groove faces, but the apex of said tongue being blunter than the apex of said groove, whereby when said tongue is forced co-axially to flow into the groove, the length of the elements in contact between the tongue and the groove is increased, and a continuous conical surface contact maintained.

2. A pipe connection comprising, in combination, a plurality of co-operating members having a tubular passage, and means for forcing said members toward each other to permit the fitting to be tightened, one of said members having an annular groove spaced from and surrounding said passage and constituting a double-faced seat, the other member having a tongue mating with said groove, both the tongue and the groove being of a substantially conical cross-section so as to have elements in common along their surface of contact, but the apex of the tongue being somewhat blunter than the apex of the groove which is provided with a substantially acute apex, said groove acting at its apex as a stop for the tongue when the same is caused under pressure to flow into the groove and to assume a true conical form, and the conical form of the groove providing to its apex a continuous conical surface contact with the tongue.

3. The herein described pipe fitting comprising, in combination, a plurality of co-operating members having a tubular passage, each of said members having an annular groove spaced from and surrounding said passage and constituting a double-faced seat, a double tongue ring fitted into both of said grooves, the faces of each groove being of conical form and intersecting to form a substantially acute angle so as to form a groove of conical section, each of the tongue parts being likewise of approximately conical section of an inclination corresponding to the faces of the grooves and having elements in surface contact with the elements of that groove into which it projects, thus providing a conical surface contact along each of the four groove faces, but each apex of the double tongue member being blunter than the apex of its groove, whereby when said tongue member is forced co-axially to flow into the groove, the length of the elements in contact between the tongue and the groove is increased and a continuous conical surface contact maintained along each seat, and means to force the members first mentioned toward each other.

In testimony whereof I affix my signature.

FRANCIS J. DOWLING.